United States Patent [19]

Takahashi

[11] Patent Number: 4,509,363
[45] Date of Patent: Apr. 9, 1985

[54] SYSTEM FOR DIAGNOSING A DEVICE OF AN INTERNAL COMBUSTION ENGINE

[75] Inventor: Toshio Takahashi, Mitakashi, Japan

[73] Assignee: Fuji Jukogyo Kabushiki Kaisha, Tokyo, Japan

[21] Appl. No.: 536,038

[22] Filed: Sep. 26, 1983

[30] Foreign Application Priority Data

Oct. 1, 1983 [JP] Japan ................................ 57-173624

[51] Int. Cl.³ .......................................... G01M 15/00
[52] U.S. Cl. .................................................... 73/118
[58] Field of Search ................. 73/116, 118, 119 R; 340/52 R, 52 F; 123/480, 494

[56] References Cited

U.S. PATENT DOCUMENTS

| 3,938,075 | 2/1976 | Reddy | 340/52 R |
| 4,094,191 | 6/1978 | Goetsch et al. | 73/118 |
| 4,219,798 | 8/1980 | Frister | 340/52 F |
| 4,244,340 | 1/1981 | Herth et al. | 123/440 |
| 4,246,566 | 1/1981 | Endo et al. | 340/52 F |

FOREIGN PATENT DOCUMENTS 909266 3/1982 U.S.S.R. ............................ 73/119 R

Primary Examiner—Jerry W. Myracle
Attorney, Agent, or Firm—Martin A. Farber

[57] ABSTRACT

A system for diagnosing a device such as a fuel pump of an internal combustion engine mounted on a vehicle. The system is provided with an engine operating condition detecting device, for example, engine speed detecting circuit for producing an output, a converter for converting the output to a control voltage, and a driver responsive to the control voltage for driving the device. In normal driving condition of the vehicle, the control voltage form the converter is fed to the driver passing through a first gate. The system further comprises a force-driving system for forcibly driving the device. The force-driving system comprises a manual operated terminal for applying a voltage, an oscillator for producing pulses, and a second gate responsive to the voltage from the terminal for controlling the pulses. The first gate is applied with the pulses and operates to pass the pulses in response to the level of the control voltage, whereby the device is driven by the pulses at a high frequency.

4 Claims, 3 Drawing Figures

FIG. 3

|   | I   | II | III | IV | V   |
|---|-----|----|-----|----|-----|
| A | H-L | L  | L-H | H  | H   |
| B | H-L | L  | L-H | L  | L-H |
| C | H-L | H  | L   | H  | H   |
| D | H-L | H  | L   | L  | L   |

SYSTEM FOR DIAGNOSING A DEVICE OF AN INTERNAL COMBUSTION ENGINE

BACKGROUND OF THE INVENTION

The present invention relates to a diagnosis system for internal combustion engines, and more particularly to a system for diagnosing trouble of a mechanical part of a device such as an actuator, pump mounted on a motor vehicle or a relay for actuating the pump.

Trouble of a mechanical part, such as a pump, a movable member or an actuator can not be monitored by an electrical diagnosis system. In conventional trouble diagnosis, trouble of a part is detected by hearing sound emitted from the part during the operation thereof. However, it is difficult to judge trouble of a continuously operating device such as a pump, since the operation sound is at a constant level and noise emitted from other devices is very loud compared with the operation sound. On the other hand, a relay for actuating the pump must be checked at the exciting time of the relay. However, it is difficult to coincide the checking time with the exciting time.

SUMMARY OF THE INVENTION

The object of the present invention is to provide a diagnosis system in which a device to be diagnosed is operated at a high frequency and trouble of the device can be detected by hearing the sound emitted by the frequent operation.

According to the present invention, there is provided a system for diagnosing a device of an internal combustion engine mounted on a vehicle comprising; first means for detecting engine operating condition and for producing an output; second means for converting said output to a control signal; a driver responsive to said control signal for driving said device; a first gate means for controlling said control signal from said second means to said driver; a force-driving system for forcibly driving said device; said force-driving system comprising a manual operated terminal for applying a voltage; an oscillator for producing pulses; a second gate means responsive to said voltage from said terminal for controlling said pulses, said first gate means being applied with said pulses and operative to pass the pulses in response to the level of said control signal, whereby said device is driven by said pulses.

The present invention will be more apparent from the following description made with reference to the accompanying drawings.

BRIEF DESCRIPTION OF DRAWINGS

FIG. 3 is a truth table of the circuit of FIG. 2.

DETAILED DESCRIPTION OF THE PREFERRED EMBODIMENT

Figure 1:
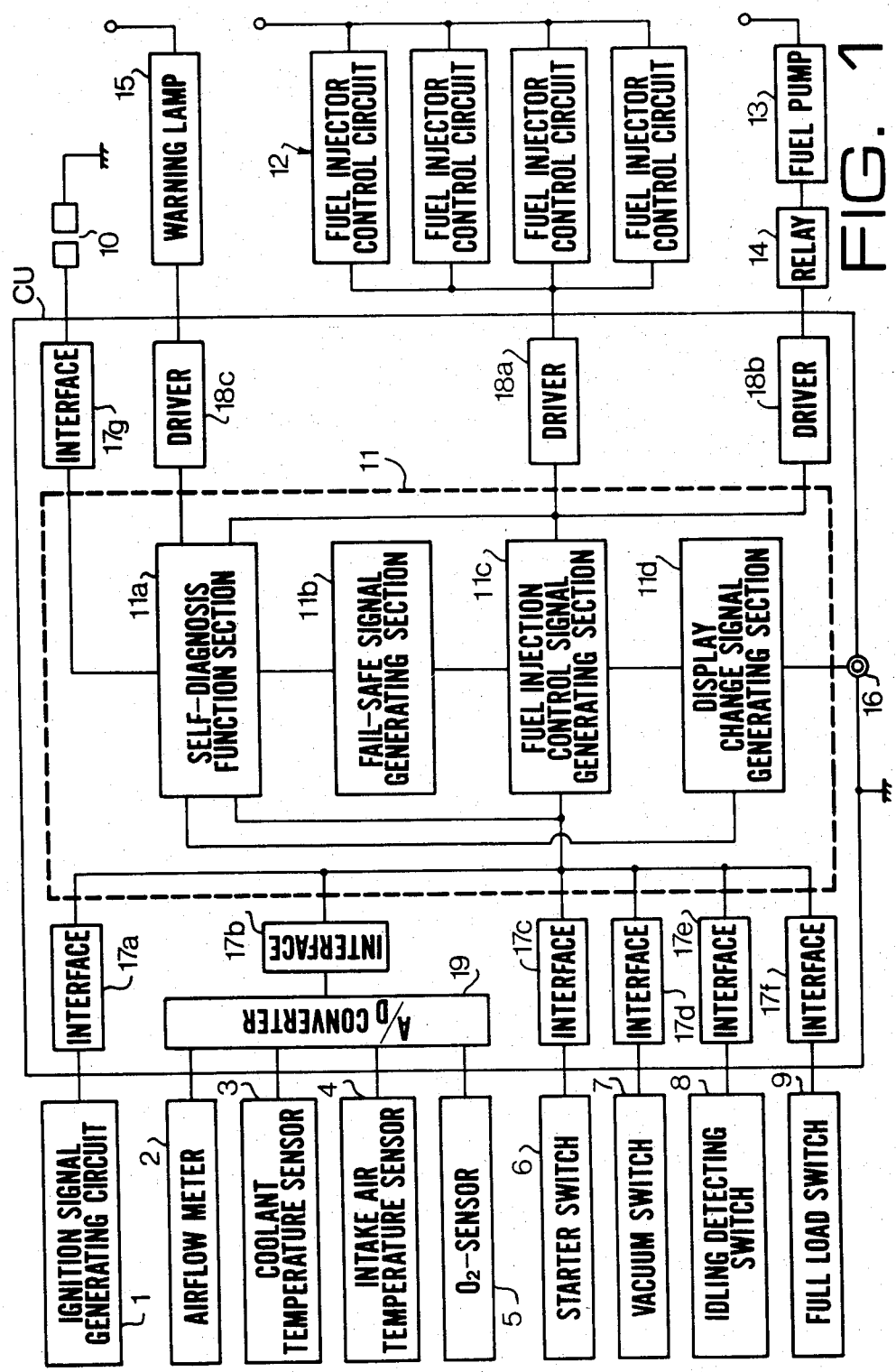
FIG. 1 is a block diagram showing a diagnosis system for operation of an engine.

FIG. 1 diagrammatically shows a diagnosis system for operation of an engine including a system of the present invention. The system comprises an engine operation detecting means group 1 to 9, and a control unit CU. The control unit CU comprises a computor 11 including memories, I/O and timers, an interface group 17a to 17g, drivers 18a to 18c. The detecting means group comprises an ignition signal generating circuit 1, output signal of which represents an ignited cylinder of the engine and ignition timing thereof, an air-flow meter 2, a coolant temperature sensor 3, an intake air temperature sensor 4, and an O2-sensor 5 for detecting oxygen concentration in exhaust gases. The detecting means group further comprises a starter switch 6 for detecting operation of the starter of the engine, a vacuum switch 7 for detecting the vacuum in the intake passage of the engine, an idling detecting switch 8 which is operated by a throttle valve shaft at the idling position of the throttle valve, and a full load switch 9 which is also operated by the throttle valve shaft at a wide open throttle position of the throttle valve. The computer 11 comprises a self-diagnosis function section 11a, a fail-safe signal generating section 11b, a fuel injection control signal generating section 11c and a display change signal generating section 11d. The self-diagnosis function section 11a is connected to a terminal 10 for checking of fault. When the terminal 10 is connected to the ground at a shop, fault condition memorized in the display change signal generating section 11d is displayed by the lamp 16. During the drive of the motor vehicle, the terminal 10 is disconnected from the ground. The output of the ignition signal generating circuit 1 is applied to self-diagnosis section 11a and fuel injection control signal generating section 11c through the interface 17a. Outputs of air-flow meter 2 and sensors 3 to 5 are applied to sections 11a and 11c through an A/D converter 21 and the interface 17b. Further, outputs of switches 6 to 9 are applied to sections 11a and 11c through interfaces 17c to 17f, respectively.

The self-diagnosis function section 11a monitors inputs from the engine operation detecting means group 1 to 9 and when any fault is detected, a signal is sent to a warning lamp 15 through the driver 18c to warn the fault. Further, when such a serious engine trouble that will stall the engine occurs, the self-diagnosis function section 11a sends a diagnosis signal dependent on the kind of the engine trouble to the fail-safe signal generating section 11b. The fail-safe signal generating section 11b stores a plurality of data to avoid the engine stall caused by the engine trouble and produces a fail-safe signal dependent on the diagnosis signal. The fail-safe signal is fed to the fuel injection control signal generating section 11c which operates to stop the input from the detecting means group 1 to 9.

In normal engine operation, the fuel injection control signal generating section 11c operates to produce an air-fuel ratio control signal by computing inputs applied from the engine operation detecting means group 1 to 9. The air-fuel ratio control signal is fed to a fuel pump 13 through the driver 18b and a relay 14 and to fuel injector control circuits 12 through the driver 18a so as to inject a proper amount of fuel at a proper time. Further, the fuel injection control signal generating section 11c sends a signal to a switching section 11d in response to an input from the O2-sensor 5. The switching section 11d sends a signal to a monitor lamp 16 in response to the signal from the fuel injection control signal generating section 11c to indicate a fact that normal oxygen concentration is included in exhaust gases.

When the fail-safe signal is fed from the fail-safe signal generating section 11b to the fuel injector control signal generating section 11c, the section 11c produces a quasi air-fuel ratio control signal dependent on the fail-safe signal. The quasi air-fuel ratio control signal is sent to fuel injection control circuits 12, so that the engine continues to operate in accordance with the quasi signal without stalling.

Further, the switching section 11d sends a signal to the lamp 16 in dependency on the diagnosis signal fed from the self-diagnosis function 11a. The lamp 16 intermittenlly lights in accordance with a pattern which is decided by the diagnosis signal by connecting the terminal 10 to the ground at a shop. An inspector in the shop can know the kind of the engine trouble by the pattern of the lighting of the lamp 16.

Figure 2:
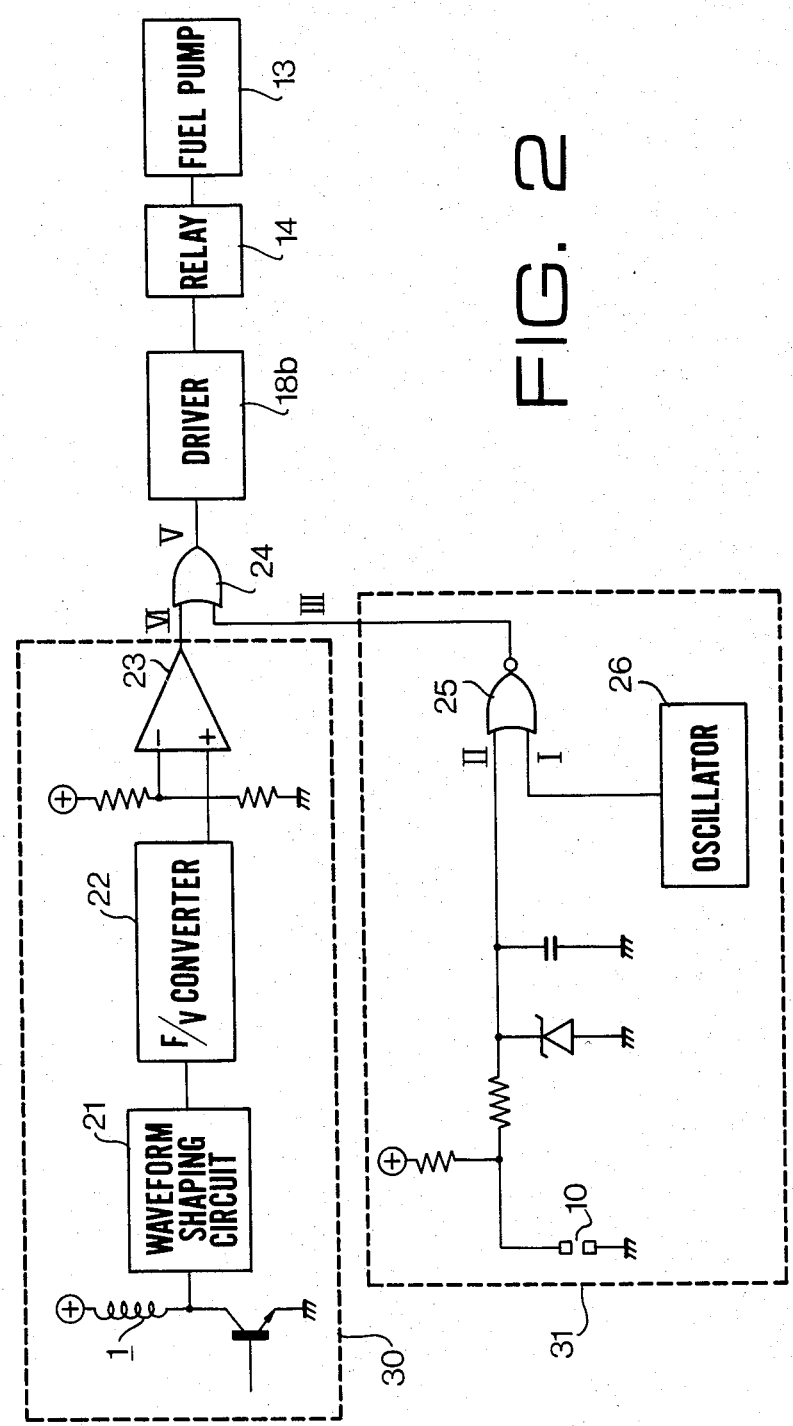
FIG. 2 is a block diagram showing a diagnosis system according to the present invention.

Referring to FIG. 2 showing a diagnosis system according to the present invention, the system comprises a fuel pump driving system 30 for normal driving of a vehicle and a fuel pump force-driving-system 31 at a high frequency. The fuel pump 13 is driven in accordance with engine speed signal. The engine speed signal is obtained by ignition pulses generated by the ignition pulse generating circuit 1. The ignition pulses are shaped by a waveform shaping circuit 21 and converted to voltage by a frequency-to-voltage (F/V) converter 22. The output voltage of the converter 22 is compared with a reference voltage by a comparator 23. When the engine speed is higher than a very low speed $N_o$ which is approximately zero, the output IV of the comparator 23 is at a high level. The output of the comparator is applied to an OR gate 24.

The fuel pump force-driving-system 31 comprises the terminal 10 and a NOR gate 25 applied with a high voltage when the terminal 10 is disconnected from the ground and with pulses from an oscillator 26. The output of the NOR gate 25 is applied to the OR gate 24.

During the driving of the vehicle, the terminal 10 is disconnected. Therefore, voltage at the input II of the NOR gate 25 is at a high level and the input III of the OR gate 24 is at a low level. When the input IV is at high level, which means that engine speed is higher than the speed $N_o$ the output V is high, so that the fuel pump 13 is driven by a signal applied from the relay 14 through the driver 18b. When the input IV is low, the pump 13 is not operated. These operations are shown in columns C and D of FIG. 3.

When the fuel pump 13 is diagnosed at a shop, the terminal 10 is connected to the ground. Accordingly, the voltage at the input II becomes low and pulses by the oscillator 26 pass through the NOR gate 25 and are applied to the input III of the OR gate 24. If the engine is not operated, the input IV is at low level. Thus, the output V of the OR gate oscillates in dependency on the pulses, so that the fuel pump 13 is intermittenlly driven at a high frequency. This operation is shown in column B of FIG. 3. Since the pump 13 is frequently operated and noise does not emanate from the engine, it is easy to diagnose operation of the pump. It will be understood that other devices than the fuel pump can be diagnosed by this system.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. A system for diagnosing a device of an internal combustion engine mounted on a vehicle comprising; first means for detecting an engine operating condition and for producing an output; second means for converting said output to a control signal; a driver responsive to said control signal for driving said device; a first gate means for controlling said control signal from said second means to said driver; a force-driving system for forcibly driving said device; said force-driving system comprising a manual operated terminal for applying a voltage; an oscillator for producing pulses; a second gate means responsive to said voltage from said terminal for controlling said pulses, said first gate means being applied with said pulses and operative to pass the pulses in response to the level of said control signal, whereby said device is driven by said pulses.

2. The system for diagnosing a device according to claim 1 wherein said first mean is an ignition pulse generating circuit, second means includes a frequency-to-voltage converter.

3. The system for diagnosing device according to claim 2 further comprising a comparator for comparing a control signal produced by said frequency-to-voltage converter with a referance value.

4. The system for diagnosing a device according to claim 3 wherein said device is a fuel pump.

* * * * *